(12) United States Patent
Ibata

(10) Patent No.: US 6,674,196 B2
(45) Date of Patent: Jan. 6, 2004

(54) PORTABLE DEVICE AND MOTOR MOUNTED THERETO VIA ELASTIC MEMBER

(75) Inventor: Eiichi Ibata, Tottori (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 15 days.

(21) Appl. No.: 09/841,747

(22) Filed: Apr. 25, 2001

(65) Prior Publication Data

US 2002/0047380 A1 Apr. 25, 2002

(30) Foreign Application Priority Data

Apr. 27, 2000 (JP) ......................................... 2000-127461

(51) Int. Cl.[7] ................................................. H02K 7/06
(52) U.S. Cl. .............................. 310/81; 310/43; 310/71
(58) Field of Search ............................. 310/81, 43, 44, 310/71, 40 MM; 340/407.1, 825.46

(56) References Cited

U.S. PATENT DOCUMENTS

| | | | |
|---|---|---|---|
| 5,986,367 A | 11/1999 | Tsuzaki et al. | |
| 6,208,238 B1 | * 3/2001 | Ohta | 340/391.1 |
| 6,271,610 B1 | * 8/2001 | Ibata et al. | 310/81 |
| 6,388,349 B1 | * 5/2002 | Ioka et al. | 310/81 |

FOREIGN PATENT DOCUMENTS

| | | | |
|---|---|---|---|
| EP | 0971474 A1 | 1/2000 | |
| JP | 56-107753 | 8/1981 | |
| JP | 08-130848 | 5/1996 | |
| JP | 10084649 | 3/1998 | |
| JP | 10-117460 | 5/1998 | |
| JP | 11-136327 | 5/1999 | |
| JP | 02000078790 A | * 3/2002 | H02K/5/00 |

OTHER PUBLICATIONS

International Search Report corresponding to application No. PCT/JP01/03560 dated Apr. 25, 2001.

* cited by examiner

Primary Examiner—Thanh Lam
(74) Attorney, Agent, or Firm—RatnerPrestia

(57) ABSTRACT

A portable device integrates a small dc motor. The mounting structure of the motor allows an easy installation of the motor and to lower an electric noise level substantially. An insulating first elastic member and a conductive second elastic member are disposed around outside of a motor frame. While leaf-spring type motor-terminals are conductive to feeding terminals of a device, the motor frame is shorted by the second elastic member to a grounding terminal of the device.

14 Claims, 5 Drawing Sheets

PORTABLE DEVICE AND MOTOR MOUNTED THERETO VIA ELASTIC MEMBER

TECHNICAL FIELD

The present invention relates to a portable device including a cellular phone, and more particularly, it relates to a mounting structure of a small dc motor built in the portable device.

BACKGROUND ART

A portable device, e.g., a cellular phone, integrating a small dc motor (hereinafter referred to as a motor) sometimes needs countermeasures against electrical noises produced by the motor. The following countermeasures are commonly available in the trade:

(a) Place the motor distant from the components vulnerable to the noises;
(b) Shield the components vulnerable to the noises by disposing a shielding member made of metal between the components and the motor;
(c) Rigidly mount the motor to a metallic component, e.g., a chassis of the device, with metallic parts such as screws, thereby shorting the motor to the ground on the device; and
(d) Short electrically one of pair terminals of the motor to the motor frame by, e.g., soldering.

Countermeasure (d) is disclosed in the Japanese Patent Application Non-Examined Publication No. H10-84649. This disclosure refers to a motor—for generating vibrations—mounted to a cellular phone. FIG. 5 shows a structure of this motor, and FIG. 6 shows a lateral view of a holder of the motor. In FIG. 5, first terminal 101 coupled to a first brush is conductive to motor frame 102, and second terminal 103 coupled to a second brush is conductive to conductive plate 104 on an end face of the motor. Frame 102 is sandwiched by a pair of elastic holding slips 111 of the motor holder shown in FIG. 6, and both the elements are conductive and contact to each other. Conductive plate 104 is urged by elastic conductor 112 shown in FIG. 6, and both the elements are conductive and contact to each other. In the conventional motor shown in FIG. 5, one of pair terminals of the motor is electrically conductive to frame 102.

This structure allows the motor to be attachable with more ease than coupling with a lead-wire, and to obtain desirable electrical conductivity. Recently, when people go out, they always carry the cellular phone. Thus the cellular phone often encounters a large shock. Further, the motor, per se, is a vibration generator, and the conductive contact section of the motor holder repeatedly slides with respect to the frame due to self-vibrations. Then the conductive contact section produces high polymers and results in faulty conduction. This slide can be prevented by strengthening the elastic holding slips of the motor holder; however, the motor is attached not so easy as expected because of the strengthened elastic holding slips.

The motor is wrapped in rubber holder, and then mounted to a device. This structure has better vibration-resistant and shock-resistant characteristics than the structure discussed previously. In this motor, a terminal coupled to a first brush can be conductive to the motor frame; however this coupling cannot be carried out due to the structure of the motor, or this structure causes uneasiness in coupling reliability. Someone needs a thicker grounding conductive line than that of this structure, or another one wants to shorten the grounding conductive line by connecting the motor frame direct to the device. Thus a grounding coupling structure which meets those requests is desired, and yet, the structure is desirably highly reliable and reduces noises substantially.

DISCLOSURE OF THE INVENTION

The present invention addresses the problems discussed above and aims to provide an excellent device free from radio interference.

The device of the present invention comprises the following elements:

(a) a motor including a frame of which surface is conductive;
(b) a grounding terminal disposing at a place facing the frame; and
(c) an elastic member made of conductive resin and disposed between the frame and the grounding terminal.

This structure allows the conductive frame and the confronting grounding terminal to be conductive to each other via the elastic member made of conductive resin. Thus when an impact is applied to the device, the device elastically follows and damps the impact. Further, the device and the frame can be conductive through the shortest conductive line with low impedance.

Another device of the present invention comprises the following elements:

(a) a motor including a frame of which surface is conductive and motor terminals shaping in leaf springs;
(b) feeding terminals for powering the motor and disposed at a place facing the motor terminals;
(c) a grounding terminal disposed at a place facing the frame;
(d) a first elastic member made of insulating resin and disposed such that the member urges the motor terminals to the feeding terminals, so that the motor terminals are conductive to the feeding terminals; and
(e) a second elastic member made of conductive resin and disposed between the frame and the grounding terminal.

Still another device of the present invention comprises the following elements:

(a) a motor including a frame of which surface is conductive, a first motor terminal and a second motor terminal, both the terminals shaping in leaf springs;
(b) a first feeding terminal for powering the motor and disposed at a place facing the first motor terminal;
(c) a second feeding terminal for powering the motor and disposed at a place facing the second motor terminal;
(d) a first elastic member made of insulating resin and disposed such that the member urges the first motor terminal to the first feeding terminal, so that the first motor terminal is conductive to the first feeding terminal; and
(e) a second elastic member made of conductive resin and disposed between the frame and the second feeding terminal, and disposed such that the member urges the second motor terminal to the second feeding terminal, so that the second motor terminal is conductive to the second feeding terminal.

These structures allow the motor to be mounted to the device with ease thanks to employing leaf-spring type motor terminals. The terminals are urged to the feeding terminals of the device by the elastic members, so that highly reliable coupling between the terminals and the feeding terminals can be obtained. The motor frame and the device can be conductive through the shortest conductive line with low impedance. As a result, a reliable conductive structure having substantial noise reduction effect is achievable, and thus the device free from radio interference can be provided.

A motor of the present invention is suitable to be mounted to the device discussed above, and the motor has the following structure:

the motor including a frame of which surface is conductive, where the frame is conductive to a grounding terminal of the device via an elastic member made of conductive resin.

Another motor of the present invention comprises the following elements:

a frame of which surface is conductive; and motor terminals shaping in leaf springs, where the motor terminals are urged to feeding terminals on the device side by a first elastic member made of insulating resin, and the frame becomes conductive to a grounding terminal of the device via a second elastic member made of conductive resin.

Still another motor of the present invention comprises the following elements:

a frame of which surface is conductive; and a first motor terminal and a second motor terminal, both terminals shaping in leaf springs, where the first motor terminal is urged to a first feeding terminal of the device by a first elastic member made of insulating resin, the second motor terminal is urged to a second feeding terminal of the device by a second elastic member made of conductive resin, and the frame becomes conductive to the second motor terminal via the second elastic member.

These motors structured above are mounted to the device, thereby providing advantages specific to the present invention.

DETAILED DESCRIPTION OF THE PREFERRED EMBODIMENTS

Exemplary embodiments of the present invention are demonstrated hereinafter with reference to the accompanying drawings.

First Exemplary Embodiment

Figure 1:
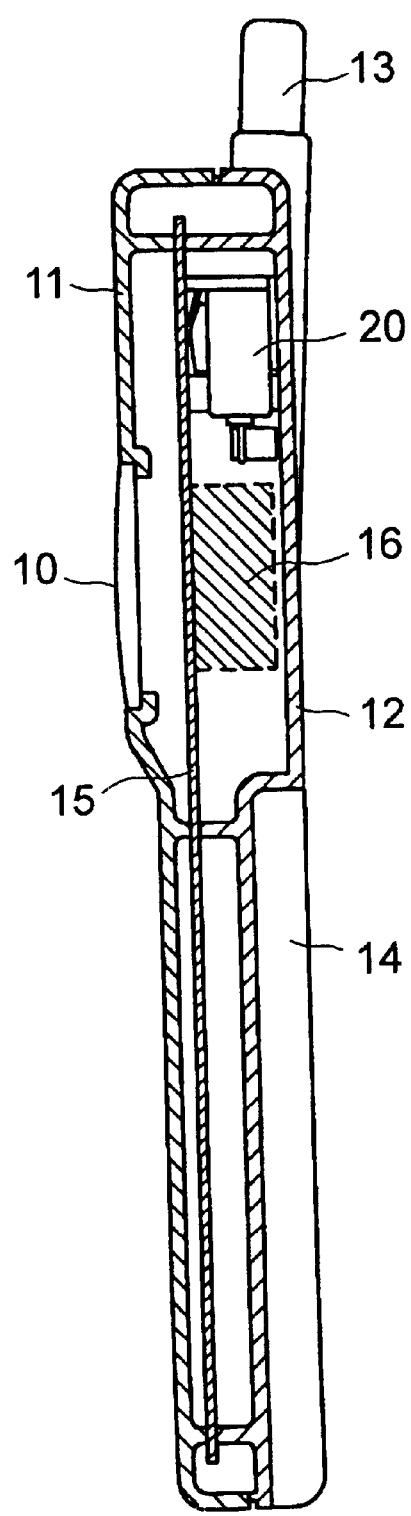
FIG. 1 is a lateral cross section of a cellular phone in accordance with a first exemplary embodiment of the present invention.
Figure 2:
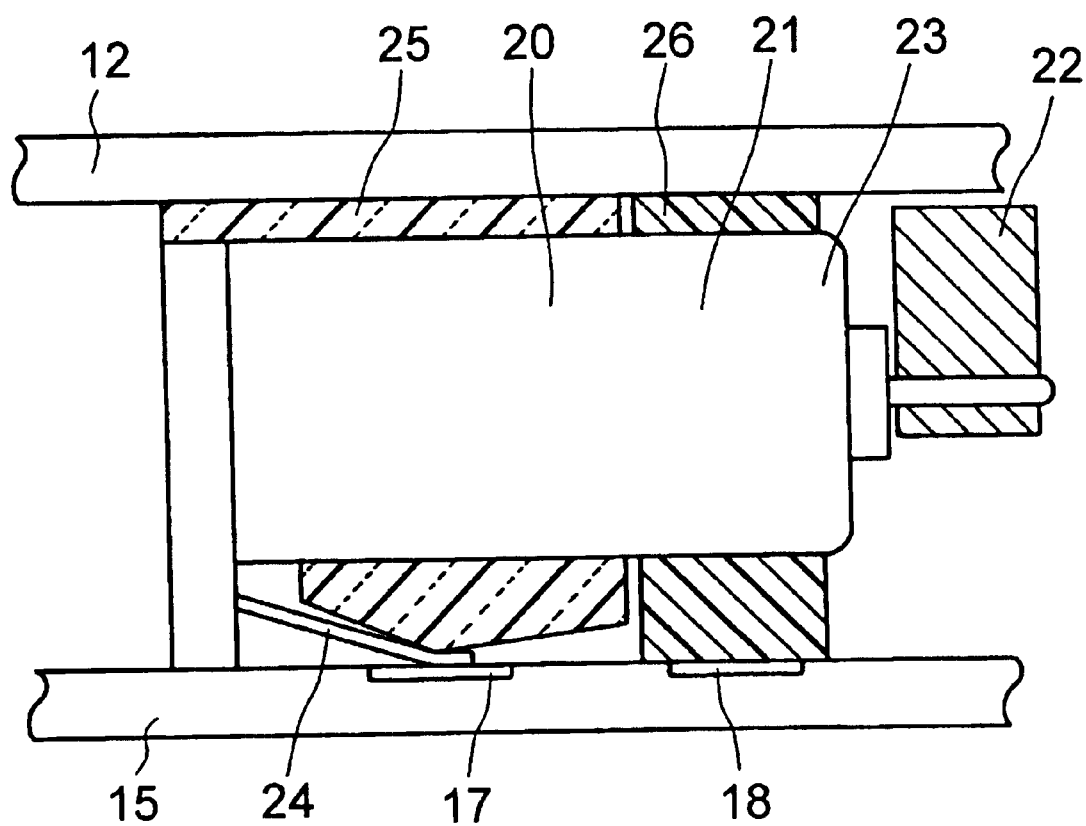
FIG. 2 is an enlarged cross section showing a mounting structure of a vibration-generating-motor built in the cellular phone shown in FIG. 1.

FIG. 1 is a lateral cross section of a cellular phone in accordance with the first exemplary embodiment of the present invention, and FIG. 2 is an enlarged cross section showing a mounting structure of a vibration generating motor built in the cellular phone shown in FIG. 1.

In FIG. 1, an entire housing of cellular phone 10 comprises upper housing 11 and lower housing 12. Antenna 13 and battery 14 are disposed outside the housing. Copper plating and electroless nickel plating are provided inside of the housing, thereby shielding the inside. Board 15 is placed inside the housing, and communication module 16—a radio transceiver—is mounted to the board. Module 16 includes a low-noise-amplifier processing a high-frequency-small-signal, a detector circuit, a voltage control oscillator (VCO) and the like. Motor 20 for generating vibrations is sandwiched between board 15 and lower housing 12. Cellular phone 10 includes many other components such as a microphone, a receiver, an operation key and a display. They are omitted in the drawings and thus the descriptions thereof are also omitted.

The motor and its peripherals are detailed with reference to FIG. 2. In FIG. 2, motor 20 for generating vibrations comprises small dc motor 21 and eccentric weight 22 (unbalance mechanism.) Motor 21, specifically a core-less motor, has for instance dimensions of a diameter: 4 mm, length: 8 mm, and weight: 0.43 g. An outer shell of motor 21 is formed of cup-shaped frame 23 made of iron system material, and its surface is conductive.

A pair of motor terminals 24 shaping in leaf springs extend from around an opening of frame 23 to board 15 such that each terminal 24 lines with board 15. This pair of terminals lead to a stator inside of the motor, and battery 14 shown in FIG. 1 supplies motor-driving-current through the terminals. The driving current spins the motor, so that eccentric weight 22 mounted to an end of motor shaft rotates to generate vibrations, which inform a user of a message arrival.

Frame 23 is wrapped in first elastic member 25 and second elastic member 26, and sandwiched between board 15 and lower housing 12. First elastic member 25 is made of insulating synthetic rubber and disposed on an opening side of frame 23, and it wraps frame 23, and at the same time, urges a pair of motor terminals 24 shaping in leaf springs to feeding terminals 17 formed on board 15.

Second elastic member 26 is made of conductive synthetic rubber, and wraps and holds the remaining section of frame 23. At the same time, second elastic member 26 functions as an electric conductor between frame 23 and grounding terminal 18 formed on board 15. One of feeding terminals 17 is conductive to grounding terminal 18 on the board, thereby forming parts of a grounding line. In this case, instead of providing a grounding terminal on the board, the housing can be used as the grounding terminal, then the grounding line coupled to the one of feeding terminals 17 can be conductive to the housing.

As discussed above, in the first embodiment, elastic member 25 made of insulating resin urges motor terminals 24 shaping in leaf springs to feeding terminals 17 disposed on a device. Elastic member 25 is disposed in the vicinity of these two elements. Elastic member 26 made of conductive resin is disposed between frame 23 and grounding terminal 18 and makes these two elements conductive to each other. This structure realizes the following advantages: (a) This structure allows the motor to be attached to the device with ease; (b) Insulating elastic member 25 urges motor terminals 24 to feeding terminals 17 keeping both the elements insulated, thereby obtaining reliable connection; and (c) Frame 23 and grounding terminal 18 of the device become conductive through the shortest conductive line with low impedance. Further, frame 23 is conductive to an electroless plated face on lower housing 12, thereby keeping frame 23 at the same voltage as the housing. A large variation of a voltage of a large metallic member, i.e., frame 23, in the housing would degrade an accuracy of frequency modulation of the VCO (voltage control oscillator) included in communication module 16. However, such a thick and short conductive line can prevent the degradation.

In this first embodiment, synthetic rubber is employed in elastic members 25 and 26. The synthetic rubber has adequate elasticity and high vibration-damping-characteristics, so that this material can hold a motor with the adequate elasticity. The synthetic rubber also maintains urging force properly between the motor terminals and the feeding terminals, and damps the slide between the terminals due to vibrations. Conductive elastic member 26 may include conductive filler mixed in material of the elastic member, or be the material undergone a conductive surface treatment.

Second Exemplary Embodiment

Figure 3A:
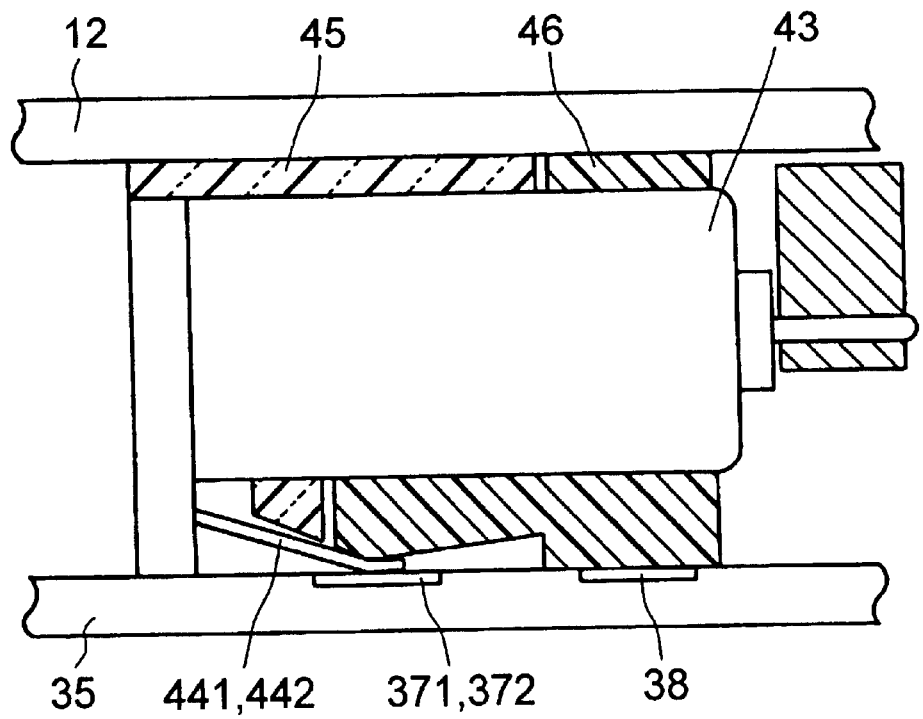
FIG. 3A is an enlarged partial lateral view showing mounting condition of a vibration-generating-motor of a cellular phone in accordance with a second exemplary embodiment of the present invention.
Figure 3B:
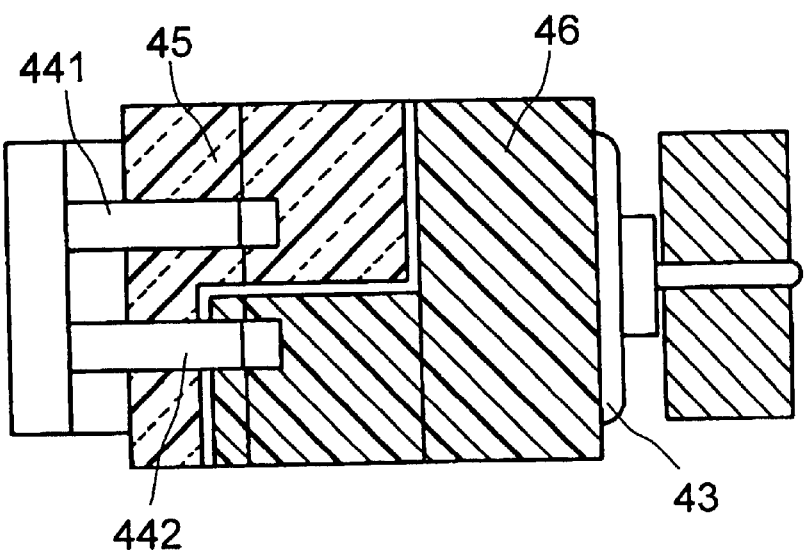
FIG. 3B is a plan view showing the mounting condition of the vibration-generating-motor shown in FIG. 3A omitting a board and a housing of the cellular phone.

FIG. 3A is an enlarged partial lateral view showing mounting condition of a vibration-generating-motor of a cellular phone in accordance with the second exemplary embodiment of the present invention. FIG. 3B is a plan view showing the mounting condition of the vibration-generating-motor shown in FIG. 3A omitting a board and a housing of the cellular phone.

In FIG. 3A, motor 41 has a pair of terminals shaping in leaf springs, and frame 43 is wrapped in first elastic member 45 and second elastic member 46. Elastic member 45 is made of insulating synthetic rubber, and wraps and holds parts of frame 43. Elastic member 46 is made of conductive synthetic rubber, and wraps and holds the remaining frame 43. These are the same conditions as the first embodiment.

In this second embodiment, however, as shown in FIG. 3B, first motor terminal 441 shaping in a leaf spring is urged by elastic member 45 against first feeding terminal 371 formed on board 35. Second motor terminal 442 shaping in a leaf spring is urged by elastic member 46 against second feeding terminal 372 formed on the board. Terminal 442 is electrically conductive to frame 43 via elastic member 46.

This structure of the second embodiment allows feeding terminal 372 to make a device and frame 43 conductive to each other through the shortest length of conductive line with low impedance. This advantage is convenient when the grounding terminal cannot be disposed at a place facing the frame or when a frame voltage is desired to be common to one of feeding terminals.

In the second embodiment, first elastic member 45 is independent of second elastic member 46; however, these two elements can be unitarily formed by two-color-molding method. In this case, two elastic members can be handled as one component. Therefore, when a motor is integrated into a device or the device is in operation, two members could deviate from each other; however, this unitarily formed one component never do that, so that reliability can be improved. The two-color-molding method may be carried out in this way: Provide two gates on one cavity and inject the resin of two colors simultaneously. Another way is this: Mold the member with a first cavity, then replace a half face of the mold to make a second cavity and inject the resin over the molded member.

Third Exemplary Embodiment

Figure 4:
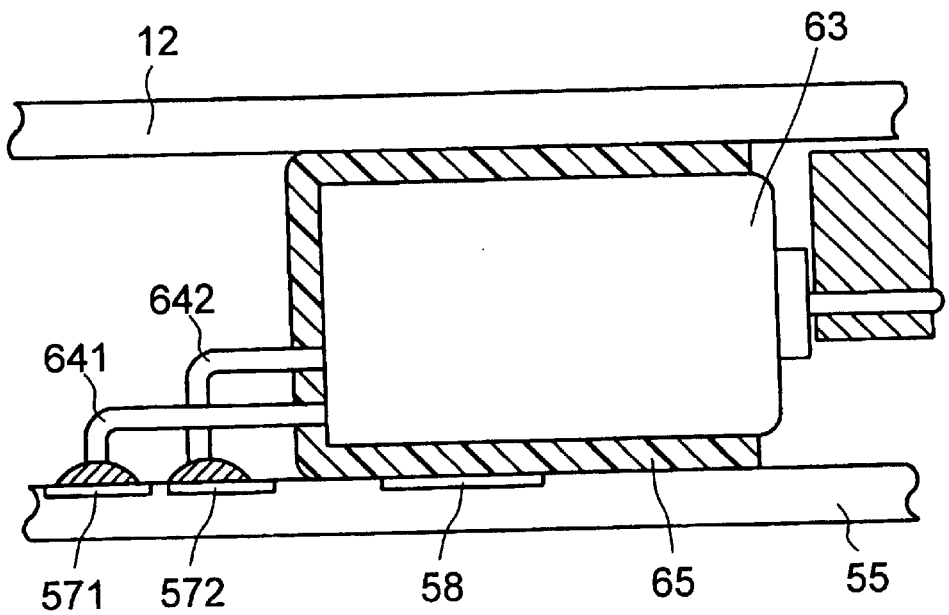
FIG. 4 is a partial enlarged view showing mounting condition of a vibration-generating-motor of a cellular phone in accordance with a third exemplary embodiment of the present invention.
Figure 5:
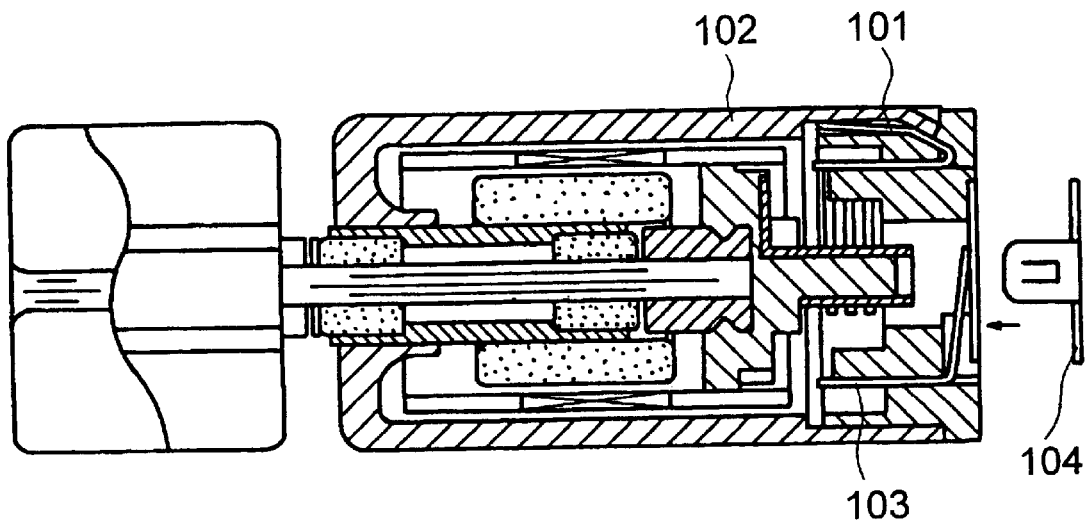
FIG. 5 shows a structure of a conventional motor.
Figure 6:
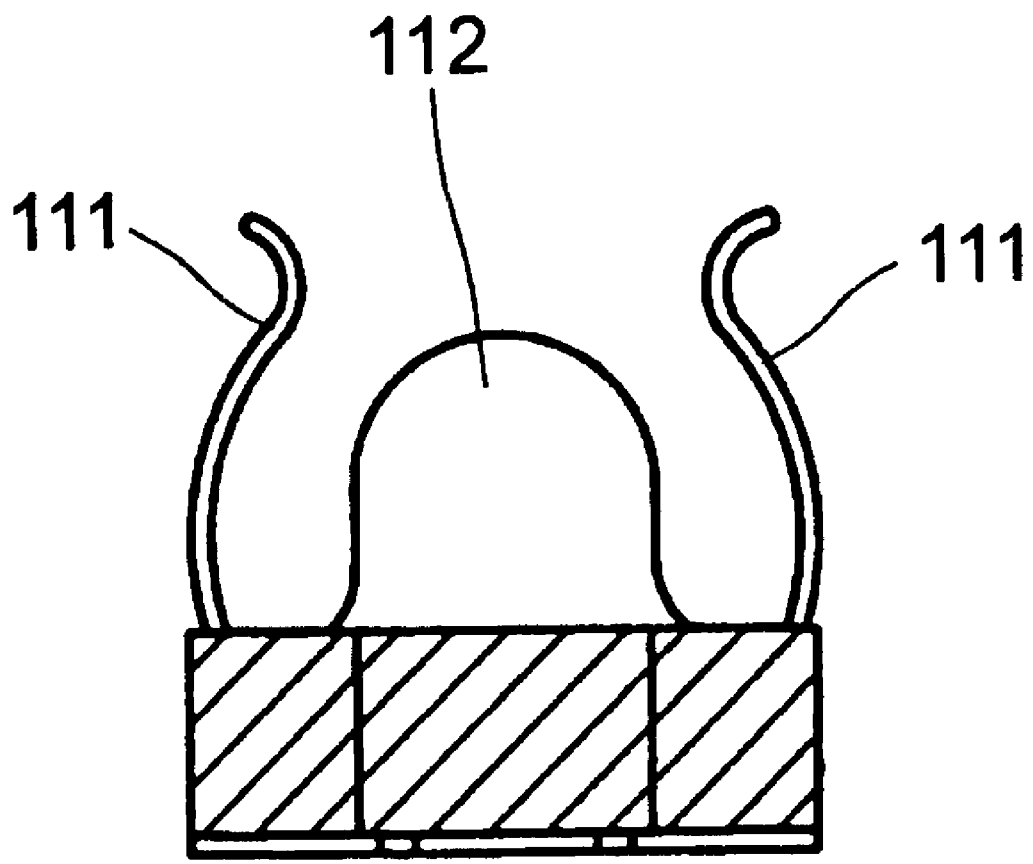
FIG. 6 is a lateral view of a motor holder of the conventional motor.

FIG. 4 is a partial enlarged view showing mounting condition of a vibration generating motor of a cellular phone in accordance with the third exemplary embodiment of the present invention.

In FIG. 4, motor terminals are coupled to feeding terminals with lead wires respectively instead of terminals shaping in leaf springs, namely, first and second motor terminals 641, 642 made of lead wires are coupled to first and second feeding terminals 571, 572 on board 55 respectively. Motor frame 63 is wrapped in elastic member 65 made of conductive resin, and sandwiched between board 55 and lower housing 12. Further, grounding terminal 58 is disposed at a place facing frame 63 on board 55, and frame 63 is electrically conductive to grounding terminal 58 via elastic member 65. Elastic member 65 used in the third embodiment also covers an opening of approx. cup-shaped frame 63, so that frame 63 and member 65 shield electromagnetic noises produced by the motor.

The third embodiment, as discussed above, proves that the present invention realizes a reliable conductive structure which reduces noises substantially. The third embodiment, in particular, employs elastic member 65 made of conductive resin, and elastic member 65 covers the opening of frame 63, so that inside of the motor is surrounded and shielded by frame 63 and elastic member 65. Therefore, electromagnetic noises generated by the motor can be shielded more strictly. If an AM, FM, or TV receiver is available in the vicinity of the device, or an apparatus handling those frequencies is in the vicinity of the device, this simple structure can prevent radio interference effectively.

The present invention effects the advantages discussed above conspicuously on the devices having a communication module such as a radio transceiver on their boards.

A cellular phone, for instance, coming with a vibration-generating-motor having an eccentric weight (unbalance mechanism), informs its user of a message arrival with vibrations, i.e., a silent notice is carried out. When a motor and a radio transceiver are placed together in the cellular phone, the present invention prevents a bad influence on the transceiver, so that excellent radio transmitting/receiving can be compatible with the silent notice.

INDUSTRIAL APPLICABILITY

A conductive frame and a grounding terminal disposed on a device at a place facing the frame are conductive via an elastic member made of conductive resin. When shocks are applied to the device, this structure can follow and damp the shocks, and the device and the frame can be conductive through the shortest conductive line with low impedance. When a motor employs leaf spring type terminals, the motor can be mounted to the device with ease. The motor terminals are urged against feeding terminals on the device by a first elastic member made of insulating resin, so that reliable coupling is achievable. This structure also allows the frame to be conductive to the device through the shortest conductive line with low impedance. When the present invention is applied to a portable device, a noise level can be substantially lowered, and a reliable conductive structure is obtainable. As a result, the device with less radio interference can be provided.

What is claimed is:

1. A device comprising:
   a motor having a frame of which surface is conductive;
   a grounding terminal disposed at a place facing the frame;
   a housing for accommodating said motor; and
   an elastic member made of conductive resin, including:
      a first portion forming an electrical conductor disposed between said frame and said grounding terminal; and a second portion disposed between said frame and said housing.

2. The device as defined in claim 1 further comprising:

a board having said grounding terminal, wherein said motor and said elastic member are sandwiched between said housing and said board.

3. The device as defined in claim 2 further comprising a radio transceiver mounted to said board.

4. The device as defined in claim 1, wherein said elastic member is synthetic rubber.

5. The device as defined in claim 1, wherein the frame roughly shapes in a cup, and an opening of the cup is covered by said elastic member.

6. The device as defined in claim 1, wherein said motor includes an unbalance mechanism for generating a vibration due to rotating.

7. A device comprising:

(a) a motor having a frame of which surface is conductive and a motor terminal in a leaf spring shape;

(b) a feeding terminal for powering said motor and disposed at a place facing the motor terminal;

(c) a grounding terminal disposed at a place facing the frame;

(d) a first elastic member made of insulating resin and disposed for urging the motor terminal to said feeding terminal; and (e) a second elastic member made of conductive resin and disposed between the frame and said grounding terminal.

8. The device as defined in claim 7 further comprising:

a housing; and a board having said feeding terminal and said grounding terminal, wherein said motor, said first and said second elastic members are sandwiched between said housing and said board.

9. The device as defined in claim 8 further comprising a radio transceiver mounted to said board.

10. The device as defined in claim 7, wherein said first and second elastic members are unitarily formed by two-color-molding method.

11. The device as defined in claim 7, wherein said first and said second elastic members are synthetic rubber.

12. The device as defined in claim 7, wherein the frame roughly shapes in a cup, and an opening of the cup is covered by said second elastic member.

13. The device as defined in claim 7, wherein said motor includes an unbalance mechanism for generating a vibration due to rotating.

14. A motor comprising:

a frame of which surface is conductive; and a motor terminal in a leaf spring shape, wherein said motor terminal is urged by a first elastic member made of insulating resin to a feeding terminal of a device, and said frame is conductive to a grounding terminal of the device via a second elastic member made of conductive resin.

* * * * *